:::{.cols}
(12) United States Patent
Byun (10) Patent No.: US 9,570,720 B2
(45) Date of Patent: Feb. 14, 2017
:::

(54) RECHARGEABLE BATTERY

(71) Applicant: SAMSUNG SDI CO., LTD., Yongin-si, Gyeonggi-do (KR)

(72) Inventor: Sang-Won Byun, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 101 days.

(21) Appl. No.: 14/588,103

(22) Filed: Dec. 31, 2014

(65) Prior Publication Data

US 2015/0311482 A1 Oct. 29, 2015

(30) Foreign Application Priority Data

Apr. 23, 2014 (KR) ........................ 10-2014-0048755

(51) Int. Cl.
*H01M 2/06* (2006.01)
*H01M 2/14* (2006.01)
*H01M 2/18* (2006.01)
*H01M 10/04* (2006.01)

(52) U.S. Cl.
CPC ................. *H01M 2/06* (2013.01); *H01M 2/14* (2013.01); *H01M 2/18* (2013.01); *H01M 10/0468* (2013.01); *H01M 10/0431* (2013.01)

(58) Field of Classification Search
CPC ............. H01M 2/06; H01M 2/14; H01M 2/18
See application file for complete search history.

(56) References Cited

U.S. PATENT DOCUMENTS

2013/0288101 A1* 10/2013 Kim .................. H01M 2/18
429/144

FOREIGN PATENT DOCUMENTS

KR 10-0717801 5/2007
KR 10-1309151 9/2013

OTHER PUBLICATIONS

Korean Patent Abstracts Publication No. 10-2012-0036743 A, dated Apr. 18, 2012, for KR 10-1309151, 1 page.

* cited by examiner

*Primary Examiner* — Stewart Fraser
(74) *Attorney, Agent, or Firm* — Lewis Roca Rothgerber Christie LLP (57) ABSTRACT

A rechargeable battery includes an electrode assembly; a case accommodating the electrode assembly; a cap plate coupled to an opening of the case; an electrode terminal connected to the electrode assembly and extending through a terminal hole of the cap plate; and a retainer having first ends contacting the case and located between the electrode assembly and the side wall to support the electrode assembly and the side wall, wherein a thickness of the retainer gradually decreases away from the first ends of the retainer.

10 Claims, 8 Drawing Sheets

RECHARGEABLE BATTERY

CROSS-REFERENCE TO RELATED APPLICATION

This application claims priority to and the benefit of Korean Patent Application No. 10-2014-0048755 filed in the Korean Intellectual Property Office on Apr. 23, 2014, the entire contents of which are incorporated herein by reference.

BACKGROUND

1. Field

The described technology relates generally to a rechargeable battery assembled by vacuum sealing.

2. Description of the Related Art

A rechargeable battery differs from a primary battery in that it can be repeatedly charged and discharged, while the latter can only irreversibly convert chemical energy to electrical energy. A small sized rechargeable battery is used as a power supply for small electronic devices such as cellular phones, notebook computers, and camcorders, while a medium or large sized rechargeable battery is used as a power supply for driving motors in hybrid vehicles and electric vehicles.

Typically, a rechargeable battery includes an electrode assembly performing charging and discharging, a case receiving the electrode assembly, a cap plate coupled to an opening of the case, and an electrode terminal drawing the electrode assembly out to an outer side of the cap plate.

The rechargeable battery is assembled by being connected to the electrode assembly through the electrode terminal, installing the cap plate, inserting the electrode assembly into the case, and then welding the cap plate to the case.

After that, an inner space of the rechargeable battery is set to be vacuumed through an electrolyte injection opening formed in the cap plate during which a center portion of a wide side wall of the case may be deformed to be more concave compared to outer edge portions thereof.

Thus, the wide side wall of the case presses the electrode assembly and specifically, the center portion of the wide side wall may be subject to greater pressure compared to the outer edge portions. In other words, the electrode assembly may be non-uniformly pressed with respect to the side wall so that the electrode assembly may be prevented from uniformly charging and discharging depending on a location corresponding to the wide side wall of the case.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery that can uniformly pressure an electrode assembly with a side wall of a case by vacuum sealing.

A rechargeable battery according to an exemplary embodiment includes: an electrode assembly for performing charging and discharging; a case in which the electrode assembly is installed; a cap plate coupled to an opening of the case; an electrode terminal connected to the electrode assembly and provided in a terminal hole of the cap plate; and a retainer having a thickness set corresponding to an outer edge of the case at one side wall of the case and provided between the electrode assembly and the side wall to support the electrode assembly and the side wall, wherein the thickness is gradually decreased toward the center of the side wall.

The case forms a bottom at an opposite side of the opening and is provided with four quadrangular side walls between the opening and the bottom, the side wall includes a pair of wide walls having wide areas and a pair of narrow walls having narrow areas.

The retainer may include a first retainer member forming a maximum thickness at the cap plate and extended in a width direction of the wide wall and set in a direction that is parallel with the bottom, and a second retainer member forming the maximum thickness at the bottom and extended in the width direction of the wide wall.

The retainer forms end portions, each forming the maximum thickness, a perpendicular inner surface that is closely adhered to the electrode assembly, and an outer surface with an acute angle that is closely adhered to a wide wall of the case at a cross-section cut along a direction that is perpendicular to the bottom.

The wide wall of the case may be formed concave corresponding to the outer surface of the retainer in a vacuum state.

The first retainer and the second retainer may have a minimum thickness at a center portion of the wide wall and ends of the minimum thicknesses are disposed at a distance from each other.

The wide wall of the case may be formed concave corresponding to the outer surfaces of the first and second retainer members and a side surface of the electrode assembly, exposed between the ends of the minimum thicknesses in the vacuum sealing state.

The retainer may include a first retainer forming the maximum thickness at the cap plate and extended in a width direction of the wide wall that is set parallel with the bottom, a second retainer forming the maximum thickness at the bottom and extended in the width direction of the wide wall, and a connection portion connecting the first retainer and the second retainer at a center of the wide wall and forming a minimum thickness.

The connection portion may form at least one through-hole.

The first retainer member and the second retainer member may be provided with cut-out grooves disposed while having a gap therebetween along the width direction of the wide wall.

According to the exemplary embodiment, the retainer is provided between an outer surface of the electrode assembly and an inner surface of the case side wall, and the thickness of the retainer is thick at an outer edge of one side wall and is then gradually decreased toward the center of the side wall so that the center of the side wall of the case becomes concave and closely adhered to the retainer to thereby uniformly press the electrode assembly through the retainer in a vacuum sealing state.

DETAILED DESCRIPTION

The present invention will be described more fully hereinafter with reference to the accompanying drawings, in which exemplary embodiments of the invention are shown. The present invention may be implemented in various ways and is not limited to the exemplary embodiments described herein. Parts unrelated to the description of the exemplary embodiments are not shown in the drawings to make the description clear, and like reference numerals designate like element throughout the specification.

Figure 1:
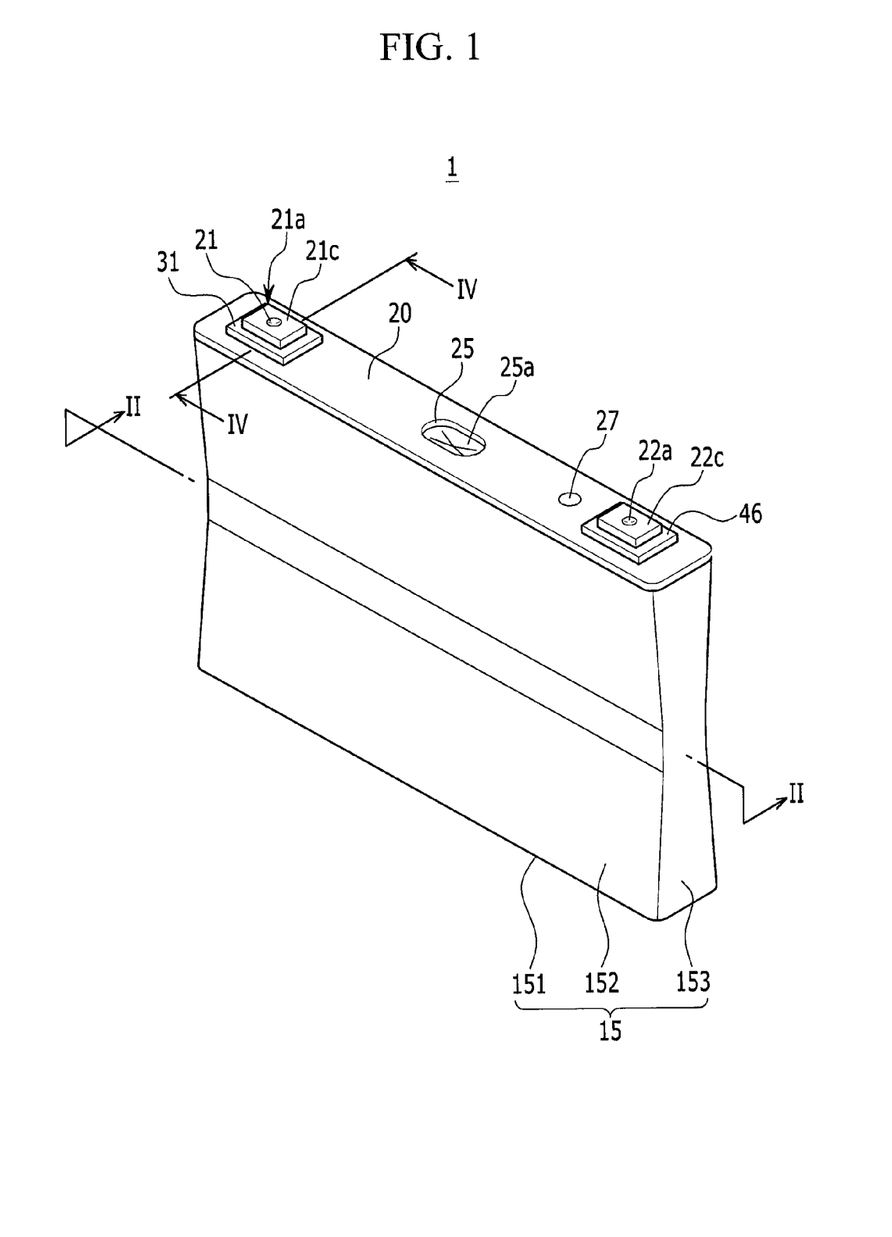
FIG. 1 is a perspective view of a rechargeable battery according to a first exemplary embodiment of the present invention.
Figure 2:
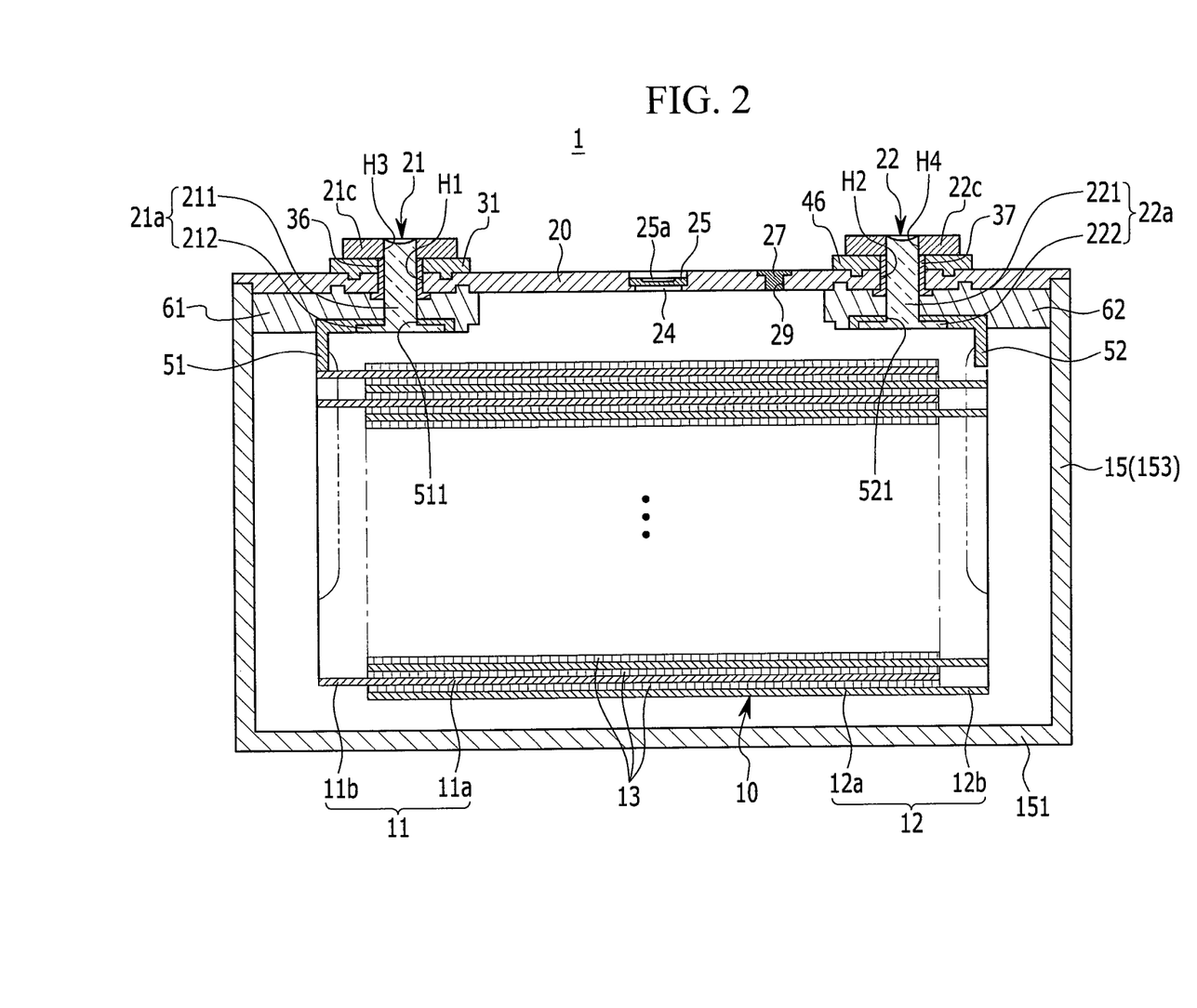
FIG. 2 is a cross-sectional view of FIG. 1, taken along the line II-II.

FIG. 1 is a perspective view of a rechargeable battery according to a first exemplary embodiment of the present invention, and FIG. 2 is a cross-sectional view of FIG. 1, taken along the line II-II. Referring to FIG. 1 and FIG. 2, a rechargeable battery 1 according to the exemplary embodiment of the present invention includes an electrode assembly 10 charging and discharging a current, a case 15 in which the electrode assembly 10 is installed, a cap plate 20 coupled to an opening of the case 15, and terminals such as a negative terminal 21 and a positive terminal 22. The negative terminal 21 and the positive terminal 22 are connected to the electrode assembly 10 and provided in terminal holes H1 and H2 of the cap plate 20.

Figure 3:
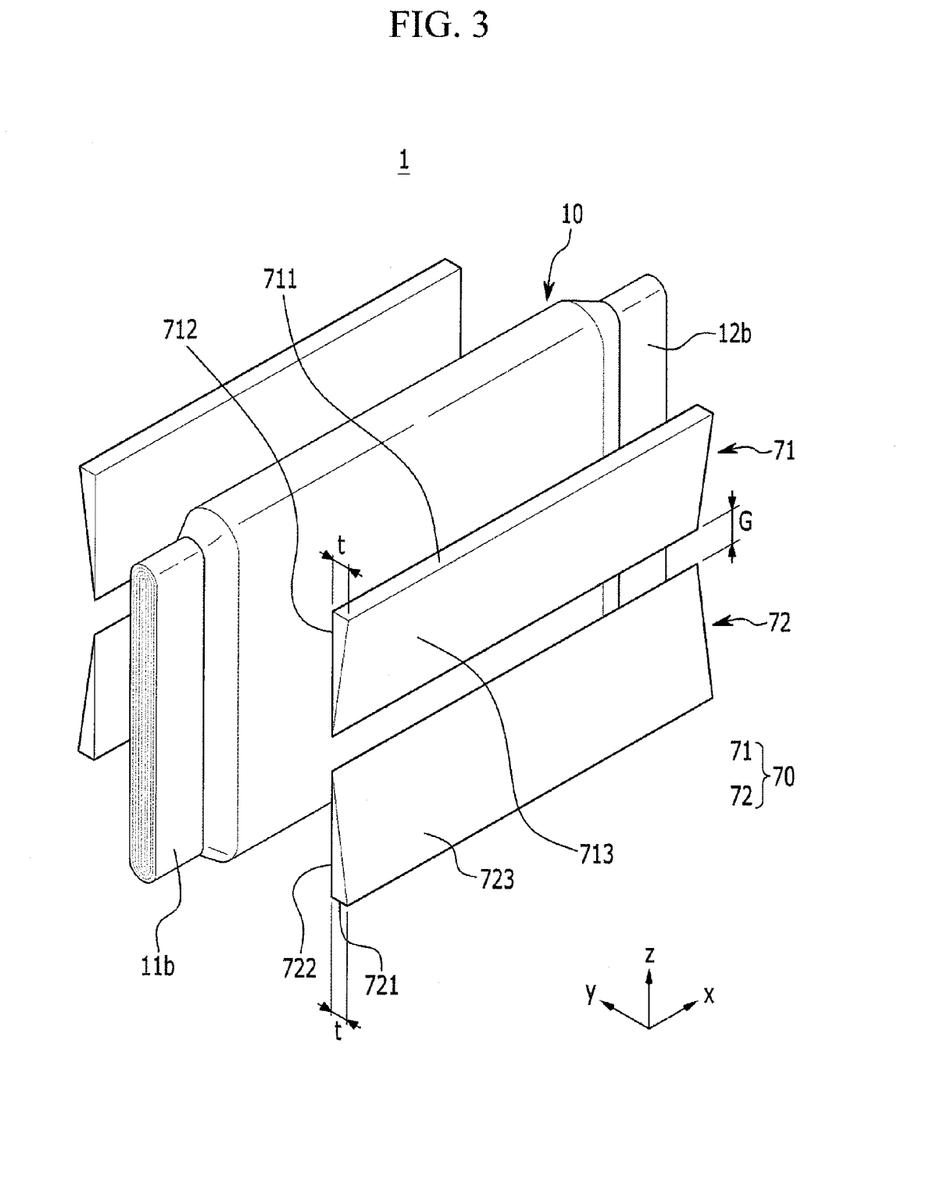
FIG. 3 is an exploded perspective view of an electrode assembly and a retainer of FIG. 2.
Figure 4:
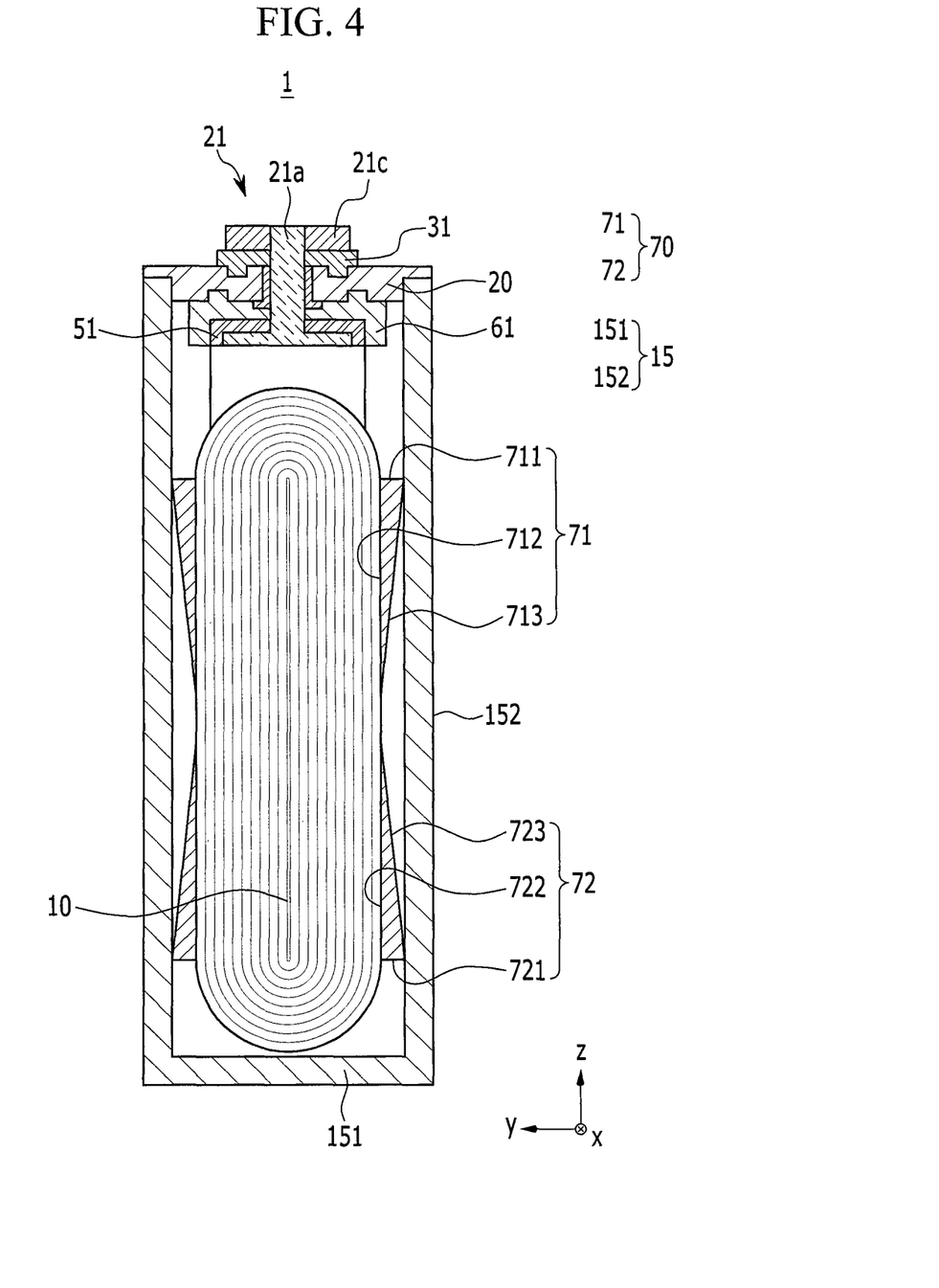
FIG. 4 is a cross-sectional view of a state before vacuum sealing of FIG. 1, taken along the line IV-IV.

FIG. 3 is an exploded perspective view of the electrode assembly and a retainer of FIG. 2, and FIG. 4 is a cross-sectional view of a state before vacuum sealing of FIG. 1, taken along the line IV-IV. Referring to FIG. 3 and FIG. 4, the rechargeable battery 1 according to the first exemplary embodiment of the present invention further includes a retainer 70 provided between the electrode assembly 10 and one side wall of the case 15.

Referring back to FIG. 2 and FIG. 3, a negative electrode 11 and a positive electrode 12 are located on respective sides of a separator 13, which is an insulator, and the negative electrode 11, the separator 13, and the positive electrode 12 are spirally wound in a jelly roll state (refer to FIG. 3) such that the electrode assembly 10 is formed flat so as to be accommodated in the case 15.

The negative electrode 11 and the positive electrode 12 respectively include coated regions 11a and 12a where an active material is coated to a current collector of a metal foil (e.g., a foil of Cu or Al), and uncoated regions 11b and 12b of which a current collector is not coated with the active material and thus is exposed.

The uncoated region 11b of the negative electrode 11 is formed at one end of the negative electrode along the spirally wound negative electrode 11. The uncoated region 12b of the positive electrode 12 is formed at one end of the positive electrode 12 along the spirally wound positive electrode 12. In addition, the uncoated regions 11b and 12b are respectively disposed at lateral ends of the electrode assembly 10.

The case 15 may be formed in the shape of a cuboid having an opening formed in one side thereof to form a space for accommodating the electrode assembly 10 therein. The electrode assembly 10 may be inserted into the space formed in the case 15 through the opening formed in one side thereof from the outside.

For example, the case 15 is provided with a bottom 151 formed in the opposite side of the quadrangular opening corresponding to the opening, and four quadrangular side walls set between the opening and the bottom 151. The side walls include a pair of wide walls 152 (first side walls) having relative large areas and a pair of narrow walls 153 (second side walls) having areas that are smaller than those of the wide walls 152 (refer to FIG. 1).

The cap plate 20 is provided in the opening of the case 15 to seal the case 15. For example, the case 15 and the cap plate 20 may be made of aluminum and may be welded to each other.

In addition, the cap plate 20 includes at least one opening, and for example, further includes an electrolyte injection opening 29 and a vent hole 24. The cap plate 20 is coupled and welded to the case 15, and an electrolyte solution is injected into the case 15 through the electrolyte injection opening 29. After injection of the electrolyte solution, the electrolyte injection opening 29 is sealed by a sealing cap 27.

The vent hole 24 is sealed by a vent plate 25 so, as to emit internal gas generated from the rechargeable battery 1 due to charging and discharging of the electrode assembly 10 and release internal pressure generated by the internal gas.

When the internal pressure of the rechargeable battery 1 reaches a predetermined pressure, the vent plate 25 is ruptured to open the vent hole 24 so that the gas and the internal pressure are released. The vent plate 25 includes a notch 25a that induces the rupture.

The negative terminal 21 and the positive terminal 22 are respectively provided in the terminal holes H1 and H2 and then electrically connected to the electrode assembly 10. In other words, the negative terminal 21 is electrically connected to the negative electrode 11 of the electrode assembly 10 and the positive terminal 22 is electrode connected to the positive electrode 12 of the electrode assembly 10. Thus, the electrode assembly 10 may be drawn out to the outside of the case 15 through the negative terminal 21 and the positive terminal 22.

The negative terminal 21 and the positive terminal 22 are electrically connected with plate terminals 21c and 22c provided in an outer side of the cap plate 20 corresponding to the terminal holes H1 and H2 and rivet terminals 21a and 22a electrically connected to the electrode assembly 10. The rivet terminals 21a and 22a are provided in the cap plate 20 through the terminal holes H1 and H2 and then fastened to the plate terminals 21c and 22c.

The plate terminals 21c and 22c include through-holes H3 and H4, and upper ends of the rivet terminals 21a and 22a penetrate the terminal holes H1 and H2 and are then inserted to the through-holes H3 and H4. The rivet terminals 21a and 22a include column portions 211 and 221 inserted into the terminal holes H1 and H2 of the cap plate 20, and flange portions 212 and 222 provided at one end of each of the column portions 211 and 221. The flange portions 212 and 222 are formed wider than cross-sections of the column portions 211 and 221, and are provided at an inner side of the cap plate 20.

A negative gasket 36 and a positive gasket 37 are respectively provided between the column portions 211 and 221 of the rivet terminals 21a and 22a and the inner sides of the terminal holes H1 and H2 of the cap plate 20, and seal and electrically insulate between the column portion 211 and 221 of the rivet terminals 21a and 22a and the terminal holes H1 and H2 of the cap plate 20.

The negative gasket 36 and the positive gasket 37 are further extended between the flange portions 212 and 222 and the cap plate 20 to further seal and electrically insulate between the flange portions 212 and 222 and the cap plate 20. In other words, the negative gasket 36 and the positive gasket 37 form a negative terminal 21 and a positive terminal 22 in the cap plate 20 to prevent the electrolyte solution from leaking through the terminal holes H1 and H2.

A negative electrode lead tab 51 and a positive electrode lead tab 52 electrically connect the negative terminal 21 and the positive terminal 22 respectively to the negative electrode 11 and the positive electrode 12 of the electrode assembly 10. In one embodiment, one end of each of the negative electrode lead tab 51 and the positive electrode lead tab 52 are connected to the rivet terminals 21a and 22a and the other ends thereof are connected to the uncoated regions 11b and 12b of the electrode assembly 10 by welding.

The column portions 211 and 221 of the rivet terminals 21a and 22a are inserted into coupling holes 511 and 521 of the negative electrode lead tab 51 and the positive electrode lead tab 52, and the flange portions 212 and 222 support the peripheral are of the coupling holes 511 and 521 so that the rivet terminals 21a and 22a and the negative and positive electrode lead tabs 51 and 52 are electrically connected to each other. The flange portions 212 and 222 and the peripheral area of the coupling holes 511 and 521 may be caulked or welded.

A negative insulation member 61 and a positive insulation member 62 are respectively provided between the negative and positive electrode lead tabs 51 and 52 and the cap plate 20 for electrical insulation therebetween.

In addition, one end of each of the negative insulation member 61 and the positive insulation member 62 are coupled to the cap plate 20, and the other ends thereof surround the negative and positive electrode lead tabs 51 and 52, the column portions 211 and 221, and the flange portions 212 and 222 of the rivet terminals 21a and 22 so that a connection structure of the negative and positive electrode lead tabs 51 and 52 and the rivet terminals 21a and 22a can be stabilized.

An external insulation member 31 is provided between the plate terminal 21c of the negative terminal 21 and the cap plate 20 for electrical insulation therebetween. In other words, the cap plate 20 maintains an electrically insulated state with the negative terminal 21.

The insulation member 31 and the plate terminal 21c are coupled to an upper end of the rivet terminal 21a, and the upper end is riveted or welded such that the insulation member 31 and the plate terminal 21c are fastened to the upper end of the rivet terminal 21a. The plate terminal 21c is provided at an outer side of the cap plate 20 while providing the insulation member 31 therebetween.

A conductive top plate 46 is provided between the plate terminal 22c of the positive terminal 22 and the cap plate 20 for electrical insulation therebetween. In other words, the cap plate 20 maintains an electrically insulated state with the positive terminal 22.

The top plate 46 and the plate terminal 22c are coupled to the upper end of the rivet terminal 22a and then the upper end is riveted or welded such that the top plate 46 and the plate terminal 22c are fastened to the upper end of the rivet terminal 22a. The plate terminal 22c is provided at an outer side of the cap plate 20 while providing the top plate 46 therebetween.

In one embodiment, the positive gasket 37 prevents the rivet terminal 22a and the top plate 46 from being directly electrically connected to each other. In other words, the rivet terminal 22a is electrically connected to the top plate 46 through the plate terminal 22c. Thus, the top plate 46 and the case 15 have a positive polarity.

Figure 5:
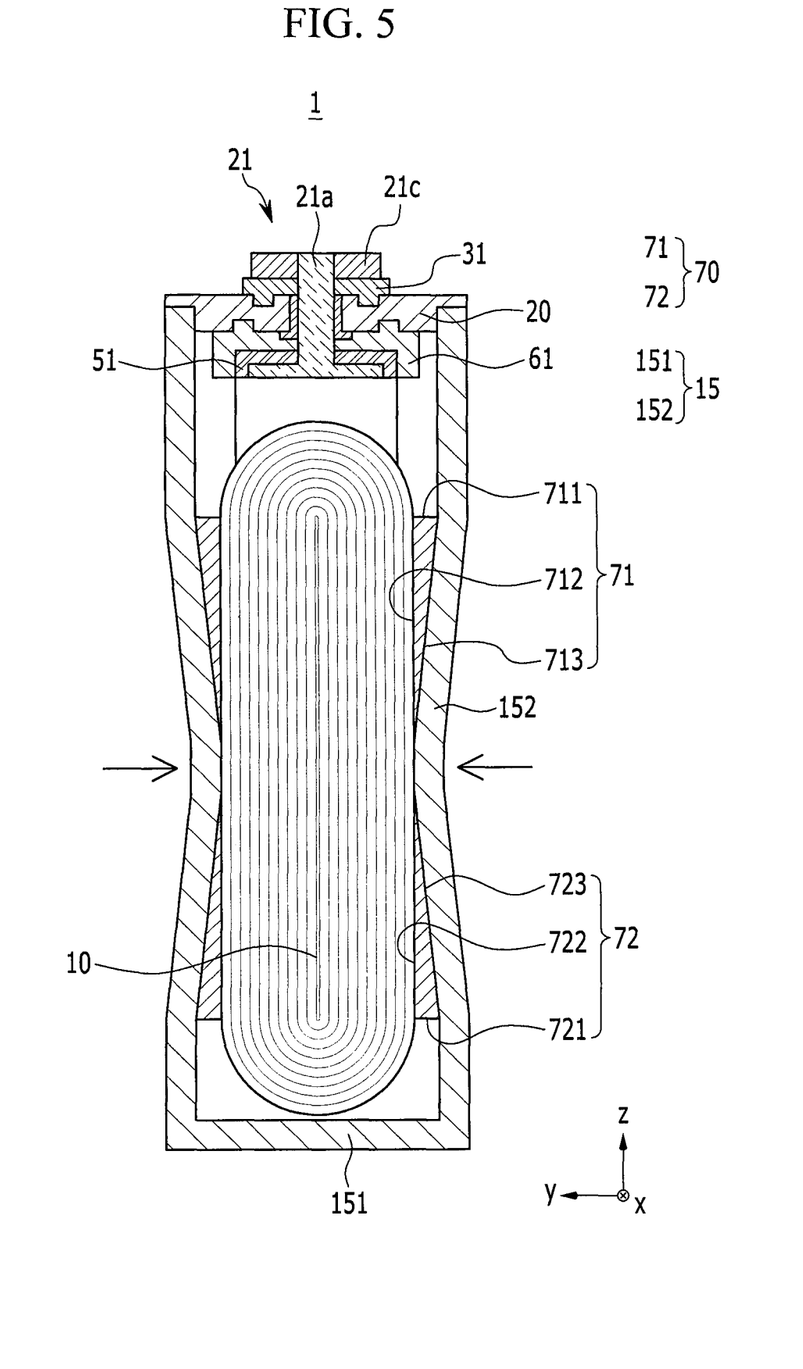
FIG. 5 is a cross-sectional view of a state after vacuum sealing of FIG. 1, taken along the line IV-IV.

FIG. 5 is a cross-sectional view of a state after vacuum sealing along the line IV-IV of FIG. 1. Referring to FIG. 3, FIG. 4, and FIG. 5, the retainer 70 has a thickness corresponding to an external edge from one side wall (e.g., a wide wall 152) of the case 15, and the thickness is gradually decreased toward the center of the side wall from the outer edge. In other words, as shown in FIG. 4, one end portion of each retaining member contacts the wide side wall of the case 15 and the thickness narrowingly tapers from that end portion toward a central portion of the wide side wall.

The retainer 70 is provided between the electrode assembly 10 and the case 15 that face each other to support the electrode assembly 10 and the wide wall 152 by closely adhering the electrode assembly 10 and the wide wall 152. In other words, the retainer 70 is provided between lateral sides of the electrode assembly 10 and between a pair of wide walls 152, respectively, in the y-axis direction.

Hereinafter, the retainer 70 in one side of the electrode assembly 10 will be described for convenience in description. As an example, the retainer 70 includes a first retainer member 71 and a second retainer member 72.

The first retainer member 71 has a maximum thickness t at an end adjacent to the cap plate 20 in the case 15 and extends along a width direction (i.e., x-axis direction) of the wide wall 152 in a direction that is parallel with the bottom 151.

The second retainer member 72 has a maximum thickness t at an end adjacent to the bottom 151 of the case 15 and is then extended in the width direction of the wide wall 152. In the z-axis direction, the first and second retainer members 71 and 72 may form a symmetric structure.

The retainer 70, that is, the first retainer member 71 and the second retainer member 72, have end portions 711 and 721, wherein each respective member exhibits its maximum thickness t at lateral sides along the z-axis direction in a cross-section (FIG. 4), which is cut along a direction that is perpendicular to the bottom 151.

In addition, the first and second retainer members 71 and 72 form perpendicular (i.e., flat) inner surfaces 712 and 722 that face and are closely adhered to the electrode assembly 10, and form outer surfaces 713 and 723 that face and are closely adhered to the wide wall 152 of the case 15 with an acute angle with the end portions 711 and 721. In other words, the outer surfaces 713 and 723 are extended with an inclination from the outer edge to the center.

In a vacuum sealing state during which assembly is performed with application of negative pressure through the electrolyte injection opening 29, the wide wall 152 of the case 15 is deformed to become concave corresponding to the outer surface of the retainer 70, that is, the outer surfaces 713 and 723 of the first and second retainer members 71 and 72. This is because the electrode assembly 10 is likely to swell more in a portion corresponding to the center compared to a portion corresponding to the outer edge of the wide wall 152.

Due to the vacuum sealing, the wide wall 152 is deformed to be concave at the inner center of the case 15 so that the wide wall 152 is closely adhered to the external surfaces 713 and 723 of the first and second retainer members 71 and 72. In other words, the wide wall 152 is maximally deformed at the center and minimally deformed at the outer edge to thereby pressure the first and second retainer members 71 and 72.

Therefore, due to the thickness difference, the wide wall 152 experiences minimum pressure at the outer edge thereof where the first and second retainer members 71 and 72 have the maximum thickness t, and experiences maximum pressure force at the center thereof where the first and second retainer members 71 and 72 have the minimum thickness.

In other words, when receiving the pressure force of the wide wall 152, the first retainer 71 and the second retainer 72 press the electrode assembly 10 with uniform pressure within an area range of the wide wall 152. Therefore, a fixing force of the electrode assembly 10 can be reinforced in the case 15. In addition, the electrode assembly 10 can experience uniform charging and discharging within the area range of the wide wall 152.

In more detail, the first retainer member 71 and the second retainer member 72 have a minimum thickness at the center portion of the wide wall 152, and end portions of the minimum thicknesses of the first and second retainer members 71 and 72 may be spaced from each other with a gap G.

In this case, in the vacuum state, the wide wall 152 of the case 15 is deformed to be concave corresponding to the outer surfaces 713 and 723 of the first and second retainer members 71 and 72 and a side surface of the electrode assembly 10 exposed between the end portions of the minimum thickness.

Due to the vacuum sealing, the wide wall 152 is closely adhered to the outer surfaces 712 and 723 of the first and second retainer members 71 and 72 and the side surface of the electrode assembly 10 while being deformed to be concave to the center of the case 15. That is, the wide wall 152 is maximally deformed at the center and minimally deformed at the outer edge so as to press the first and second retainer members 71 and 72 and the side surface of the electrode assembly 10, exposed to the gap G.

Therefore, the wide wall 152 experiences the minimum pressure force at the outer edges of the first and second retainer members 71 and 72, which is the maximum thickness t by the thickness difference, and the pressure force is gradually decreased toward the center along the first and second retainer members 71 and 72 so that the side surface of the electrode assembly 10, exposed to the gap G, experiences the maximum pressure force.

In other words, the first and second retainer members 71 and 72 and the center of the wide wall 152 corresponding to the gap G receive the pressure force of the wide wall 152 and press the electrode assembly 10 with more uniform pressure. Accordingly, the fixing force of the electrode assembly 10 in the case 15 can be reinforced.

Hereinafter, various exemplary embodiments of the present invention will be described. When comparing the exemplary embodiments with the first exemplary embodiment, descriptions of the same components are omitted and different components will be described.

Figure 6:
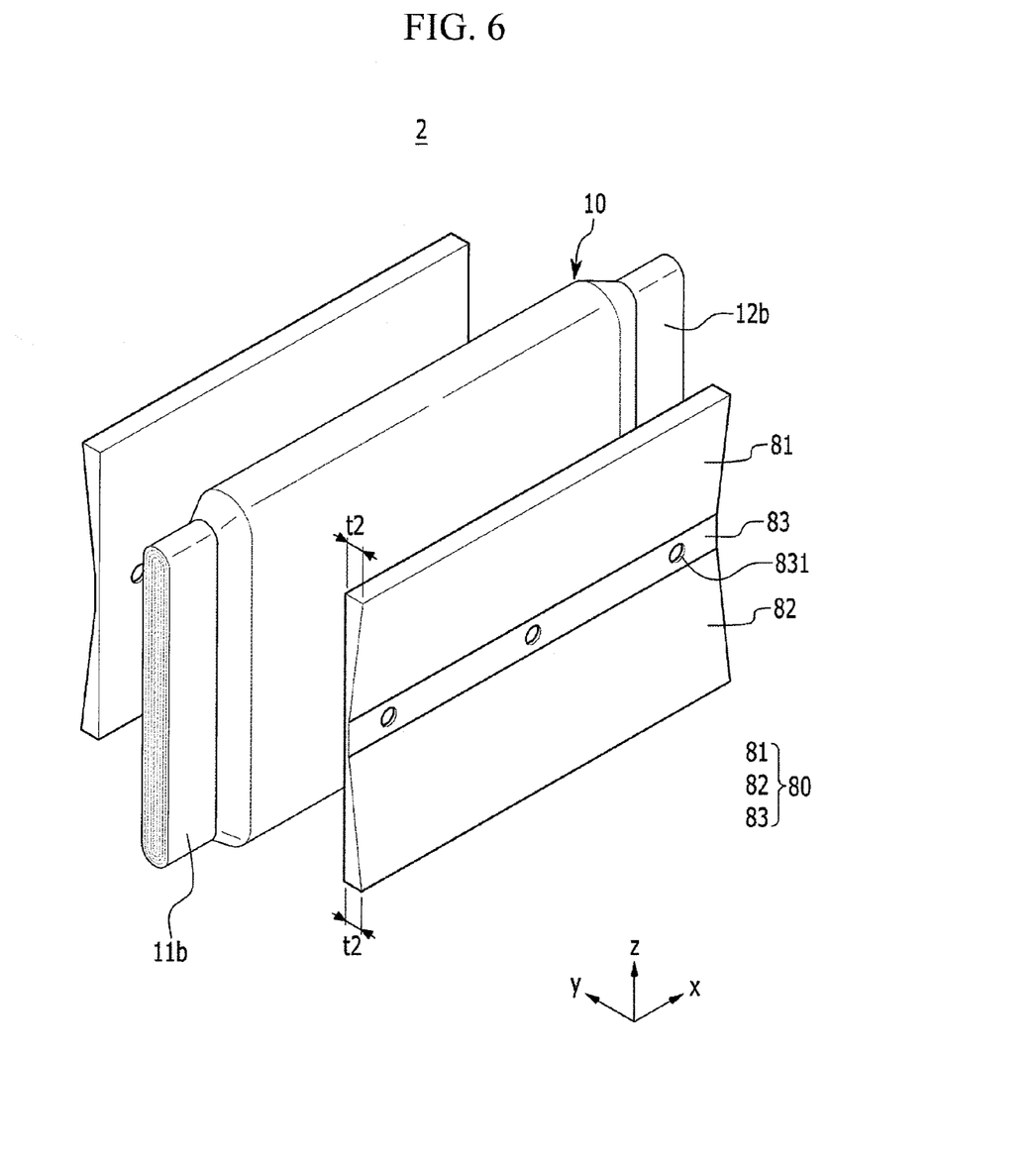
FIG. 6 is an exploded perspective view of an electrode assembly and a retainer in a rechargeable battery according to a second exemplary embodiment of the present invention.
Figure 7:
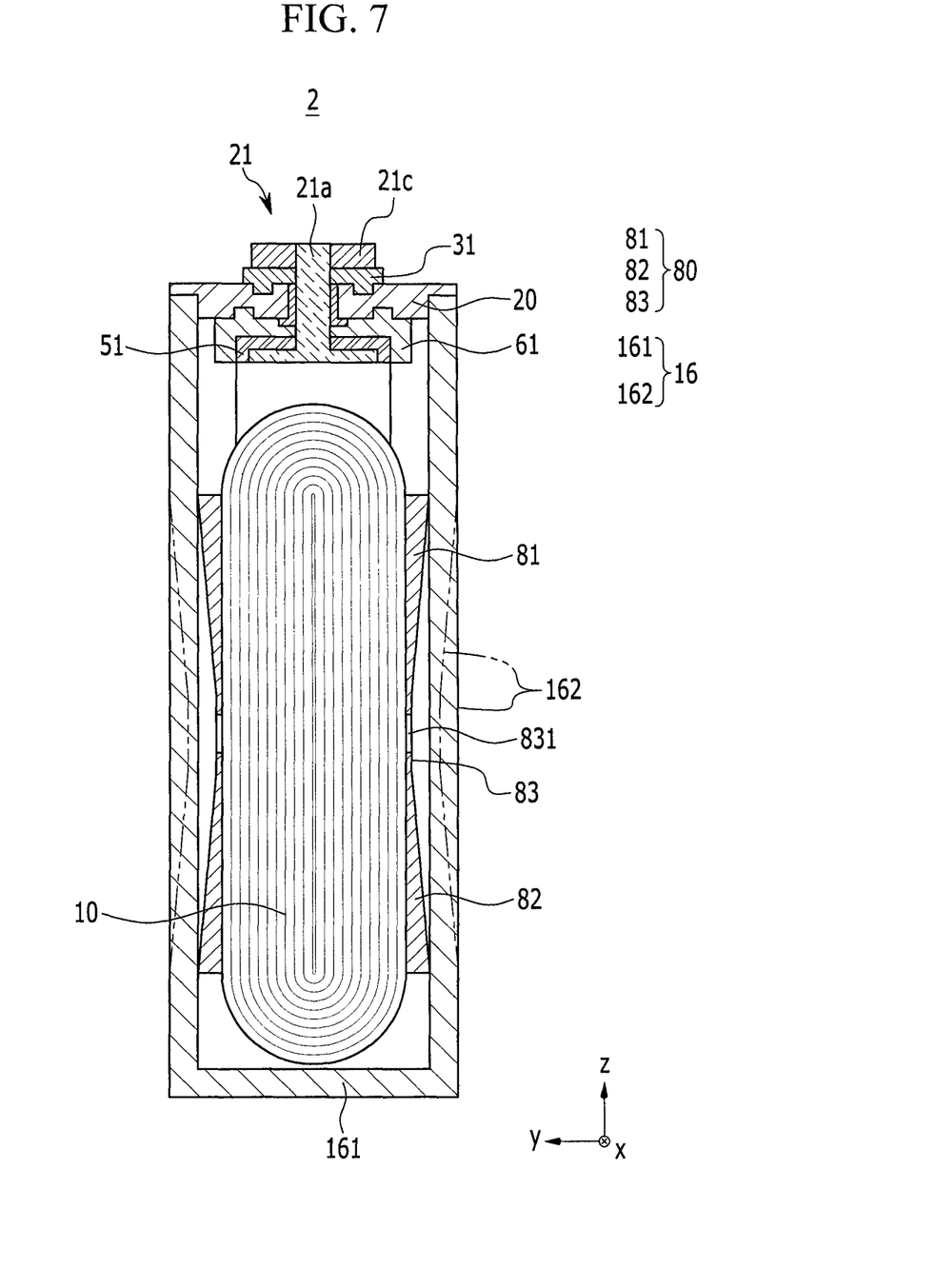
FIG. 7 is a cross-sectional view of a state after vacuum sealing in the rechargeable battery to which the retainer of FIG. 6 is applied.

FIG. 6 is an exploded perspective view of an electrode assembly and a retainer in a rechargeable battery according to a second exemplary embodiment of the present invention, and FIG. 7 is a cross-sectional view of a state after vacuum sealing in the rechargeable battery that employs the retainer of FIG. 6.

Referring to FIG. 6 and FIG. 7, in a rechargeable battery 2 according to the second exemplary embodiment of the present invention, a retainer 80 is formed by integrally forming a first retainer 81, a second retainer 82, and a connection portion 83 as a single component. Compared to the retainer 70 of the first exemplary embodiment, the number of parts of the retainer 80 according to the second exemplary embodiment is reduced so that an assembly process of the rechargeable battery 2 can be simplified.

The first retainer 81 has a maximum thickness t2 at an end portion adjacent to a cap plate 20 in a case 16 and is extended in a width direction (i.e., x-axis direction) of a wide wall 162 in a direction that is parallel with a bottom 161.

The second retainer 82 has a maximum thickness t2 at an end portion adjacent to the bottom 161 in the case 16 and then is extended in the width direction of the wide wall 162. The connection portion 83 connects the first retainer 81 and the second retainer 82 at the center of the wide wall 162 and forms the minimum thickness. In one embodiment, the connection portion 83 is provided with at least one through-hole 831.

In a vacuum state during which a negative pressure is applied through an electrolyte injection opening 29 (dotted line shown in FIG. 7), the wide wall 162 of the case 16 is deformed to be concave corresponding to outer surfaces 813 and 823 of the first and second retainers 81 and 82 and an outer surface 833 of the connection portion 83.

Due to the vacuum sealing, the wide wall 162 is closely adhered to the outer surface 813 and 823 of the first and second retainers 81 and 82 and the outer surface 833 of the connection portion 83 while being deformed to be concave toward an inner center of the case 16. That is, the wide wall 162 is maximally deformed at the center and is minimally deformed at an outer edge and then presses the first and second retainers 81 and 82 and the connection portion 83.

Therefore, due to the thickness difference, the wide wall 162 experiences the minimum pressure force at the outer edges of the first and second retainers 81 and 82, which has the maximum thickness t2, and applies the maximum pressure force at the center of the connection portion 83, which has the minimum thickness.

That is, the first and second retainers 81 and 82 receiving the pressure force of the wide wall 162 press the electrode assembly 10 with a more uniform pressure within an area range of the wide wall 162. Accordingly, a fixing force of the electrode assembly 10 in the case 16 can be reinforced.

Figure 8:
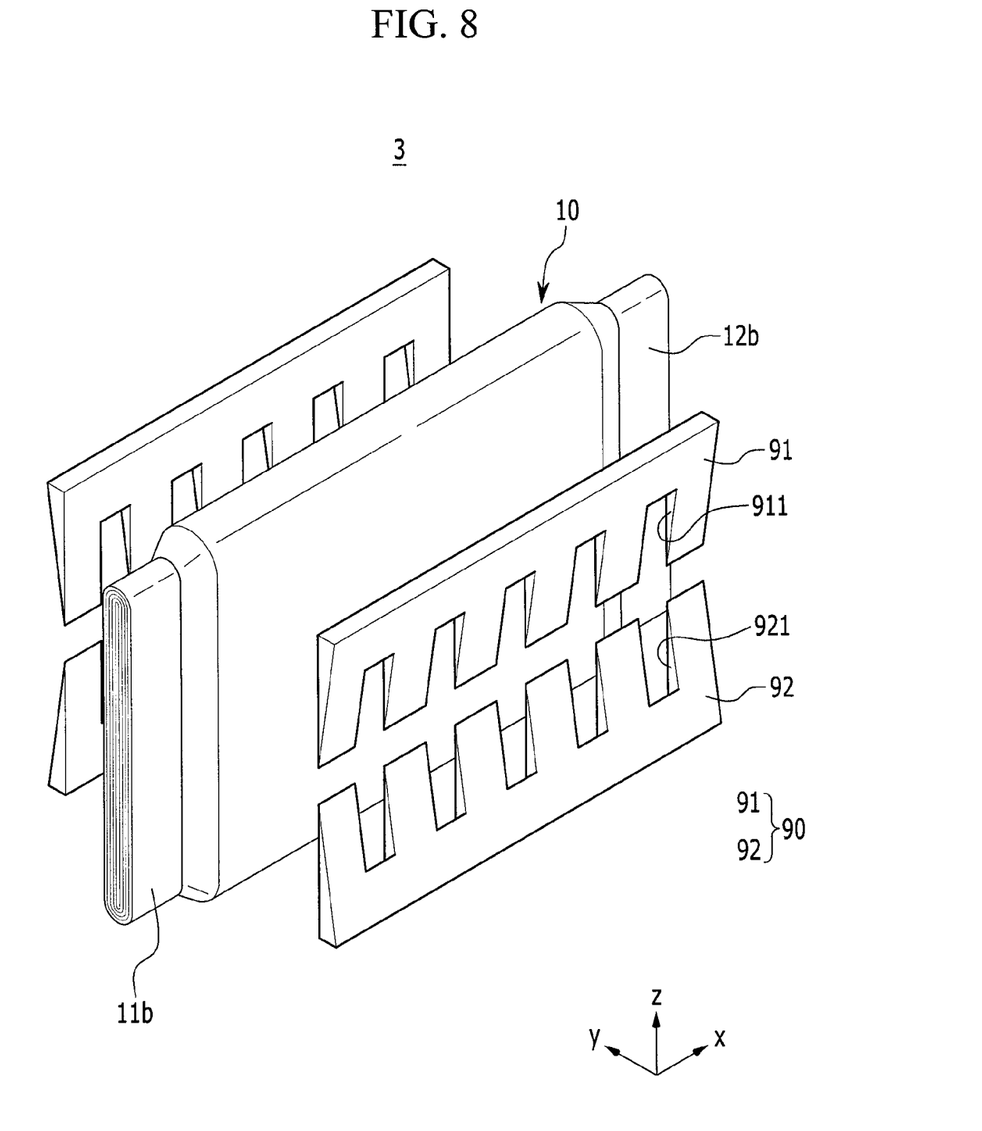
FIG. 8 is an exploded perspective view of an electrode assembly and a retainer according to a third exemplary embodiment of the present invention.

FIG. 8 is an exploded perspective view of an electrode assembly and a retainer in a rechargeable battery according to a third exemplary embodiment of the present invention. Referring to FIG. 4, FIG. 5, and FIG. 8, a retainer 90, that is, a first retainer member 91 and a second retainer member 92 are provided with cut-out grooves 911 and 921 formed at a distance from each other with a gap set along a width direction (i.e., x-axis direction) of the wide wall 162.

When the wide wall 152 is closely adhered to the first and second retainer members 91 and 92 of the third exemplary embodiment in a vacuum sealing process, a pressure force corresponding to the cut-out grooves 911 and 921 is removed so that the first and second retainer members 91 and 92 can more flexibly press the electrode assembly 10 compared to the first and second retainer members 71 and 72 of the first exemplary embodiment.

In addition, the cut-out grooves 911 and 921 can effectively exhaust residual air between the electrode assembly 10 and the first and second retainer members 91 and 92. That is, vacuum sealing during which a negative pressure is applied through an electrolyte injection opening 29 can be more simplified.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of Symbols | |
|---|---|
| 1, 2: rechargeable battery | 10: electrode assembly |
| 11: negative electrode | 11a, 12a: coated region |
| 11b, 12b: uncoated region | 12: positive electrode |
| 13: separator | 15, 16: case |
| 20: cap plat | 21, 22: negative terminal and positive terminal |
| 21a, 22a: rivet terminal | 21c, 22c: plate terminal |
| 24: vent hole | 25: vent plate |
| 25a: notch | 27: sealing cap |
| 29: electrolyte injection opening | 31: insulation member |
| 36, 37: negative gasket and positive gasket | 46: top plate |
| 51, 52: negative electrode lead tab, positive electrode lead tab | |
| 61, 62: negative insulation member, positive insulation member | |
| 70, 80, 90: retainer | 71, 91: first retainer member |
| 72, 92: second retainer member | |
| 81, 82: first retainer, second retainer | |
| 83: connection portion | 151, 161: bottom |
| 152, 162: wide wall | 153: narrow wall |
| 211, 221: column portion | 212, 222: flange portion |
| 511, 521: coupling groove | 711, 721: end portion |
| 712, 722: inner surface | 713, 723, 813, 823, 833: outer surface |
| 831: through-hole | 911, 921: cut-out groove |
| G: gap | t, t2: maximum thickness |
| H1, H2: terminal hole | H3, H4: through-hole |

What is claimed is:

1. A rechargeable battery comprising:
    an electrode assembly defining a length between opposing uncoated portions thereof;
    a case accommodating the electrode assembly and having an opening;
    a cap plate coupled to the case;
    an electrode terminal connected to the electrode assembly and extending through a terminal hole of the cap plate; and
    a retainer located adjacent the electrode assembly to support the electrode assembly along substantially its entire length, wherein a thickness of the retainer has a maximum at a first end and gradually decreases away from the first end.

2. The rechargeable battery of claim 1, wherein the case has a bottom opposite to the opening and has side walls extending between the opening and the bottom, wherein the side walls comprise a pair of wide side walls and a pair of narrow side walls, and
    wherein the retainer is provided between a lateral side surface of the electrode assembly and at least one of the wide side walls.

3. The rechargeable battery of claim 2, wherein the retainer comprises:
    a first retainer having a maximum thickness adjacent the cap plate and extending in a width direction of the wide side wall that is parallel with the bottom of the case,
    a second retainer having a maximum thickness adjacent the bottom and extending in the width direction of the wide side wall, and
    a connection portion connecting the first retainer and the second retainer at a central portion of the wide side wall and having a minimum thickness of the retainer.

4. The rechargeable battery of claim 3, wherein the connection portion has at least one through-hole.

5. The rechargeable battery of claim 1, wherein the retainer comprises:
    a first retainer member having a maximum thickness at a first end adjacent to the cap plate and extending in a width direction of a wide side wall, and a second retainer member having a maximum thickness at the first end adjacent to a bottom of the case.

6. The rechargeable battery of claim 5, wherein the retainer has a planar inner surface that contacts the electrode assembly, and an outer surface that narrowingly tapers from the first end to a second end.

7. The rechargeable battery of claim 6, wherein the wide side wall of the case is concave to correspond to the outer surface of the retainer.

8. The rechargeable battery of claim 5, wherein the first retainer and the second retainer have a minimum thickness at a second end located at a more central portion of the wide side wall than the first end and wherein the first and second retainers are spaced from each other.

9. The rechargeable battery of claim 8, wherein the wide side wall of the case is concave corresponding to the first and second retainer members and wherein a side surface of the electrode assembly is exposed between the second end of the first and second retaining members.

10. The rechargeable battery of claim 5, wherein the first retainer member and the second retainer member have cut-out grooves having a gap therebetween along the width direction of the wide side wall.

* * * * *